US005758298A

United States Patent [19]
Guldner

[11] Patent Number: 5,758,298
[45] Date of Patent: May 26, 1998

[54] AUTONOMOUS NAVIGATION SYSTEM FOR A MOBILE ROBOT OR MANIPULATOR

[75] Inventor: Jurgen Guldner, Munich, Germany

[73] Assignee: Deutsche Forschungsanstalt fur Luft-und Raumfahrt e.V., Linder Hohe, Germany

[21] Appl. No.: 404,552

[22] Filed: Mar. 15, 1995

[30] Foreign Application Priority Data

Mar. 16, 1994 [DE] Germany ............... 44 08 982.1

[51] Int. Cl.$^6$ ............................................. G06G 7/00
[52] U.S. Cl. .................. 701/23; 701/24; 701/25; 701/26; 701/28; 318/580; 318/587; 901/1; 901/3; 901/9; 901/46; 395/86; 395/94; 395/80
[58] Field of Search ................. 364/424.02, 424.01, 364/461, 444, 449, 450, 443, 424.03, 559; 340/995, 988; 395/94, 96, 80–93; 901/48, 1, 3, 9, 46, 47; 318/580, 587

[56] References Cited

U.S. PATENT DOCUMENTS

| | | | |
|---|---|---|---|
| 4,119,900 | 10/1978 | Kremnitz | 364/424.02 |
| 4,954,962 | 9/1990 | Evans, Jr. et al. | 364/424.02 |
| 4,962,453 | 10/1990 | Pong et al. | 364/424.02 |
| 5,031,109 | 7/1991 | Gloton | 364/424.02 |
| 5,032,775 | 7/1991 | Mizuno et al. | 364/424.02 |
| 5,051,906 | 9/1991 | Evans, Jr. et al. | 364/424.02 |
| 5,165,064 | 11/1992 | Mattoboni | 364/424.01 |
| 5,204,814 | 4/1993 | Noonan et al. | 364/424.02 |
| 5,214,749 | 5/1993 | Brown | 364/424.02 |
| 5,321,614 | 6/1994 | Ashworth | 364/424.02 |
| 5,502,638 | 3/1996 | Takenaka | 364/424.02 |

FOREIGN PATENT DOCUMENTS 0358628  3/1990  European Pat. Off. .

OTHER PUBLICATIONS

Jurgen Guldner et al, Sliding Mode Control for an Obstacle Avoidance Strategy Based on an Harmonic Potential Field, Institute for Robotics and System Dynamics, pp. 424–429, Dec. 1993.

Johann Borenstein et al, Obstacle Avoidance with Ultrasonic Sensors, IEEE Jornal of Robotics and Automation vol. 4, No. 2, pp. 213–218, Apr. 1988.

Bruce H. Krogh et al, Integrated Path Planning and Dynamic Steering Control for Autonomous Vehicles, IEEE, pp. 1664–1669, Feb. 1986.

Yoram Koren et al, Potential Field Methods and Their Inherent Limitations for Mobile Robot Navigation, IEEE, pp. 1398–1404, Apr. 1991.

Hwang et al: Path planning using a potential field representation, IEEE, Apr. 1989.

Borenstein et al: Real–time obstacle avoidance for fast mobile robots, IEEE, Sep. 1989.

Warren: Global path planning using artificail potential fields, IEEE, Aug. 1989.

Guldner et al: Mobile robots in complex environments –a three–layered hierarchical path control system, IEEE, Sep. 1994.

*Primary Examiner*—Jacques H. Louis-Jacques
*Attorney, Agent, or Firm*—Browdy and Neimark

[57] ABSTRACT

In an autonomous navigation system for a mobile robot or a manipulator which is intended to guide the robot through the workspace to a predetermined target point in spite of incomplete information without colliding with known or unknown obstacles. All operations are performed on the local navigation level in the robot coordinate system. In the course of this, occupied and unoccupied areas of the workspace are appropriately marked and detected obstacles are covered by safety zones. An intermediate target point is defined in an unoccupied area of the workspace and a virtual harmonic potential field is calculated, whose gradient is followed by the robot. Mobile robots with such an autonomous navigation system can be used as automated transport, cleaning and service systems.

23 Claims, 11 Drawing Sheets

AUTONOMOUS NAVIGATION SYSTEM FOR A MOBILE ROBOT OR MANIPULATOR

FIELD OF THE INVENTION

The invention relates to an autonomous navigation system for a mobile robot or manipulator.

REVIEW OF THE RELATED TECHNOLOGY

Mobile robots are used as automated transport, cleaning and service systems, mainly to relieve people of work which is hazardous to health or dangerous. Robots are intended for important work in connection with space travel, for example in the course of autonomous exploration of planetary surfaces or as manipulators in connection with the construction and servicing of space stations.

An autonomous navigation system is intended to guide a mobile robot or manipulator to a preselected target point in a workspace by means of a reference route. The reference route to the target point is planned by global path planning on the basis of global information regarding the workspace of the robot and all objects and obstacles present therein. The disadvantages in global path planning are the restrictive requirements on the quality of the information regarding the topology of the workspace and on keeping to the preplanned route, as well as the high complexity of processing voluminous global information. Since the high computing outlay connected therewith is hard to realize in real time, the reference route is generally planned ahead of time.

A strategy for global path planning by means of virtual harmonic potential fields in workspaces with a known topology and exclusively known obstacles is described by J. Guldner and V. Utkin in "Sliding Mode Control for an Obstacle Avoidance Strategy Based on a Harmonic Potential Fields" in Proceeding of the 32nd IEEE Conference on Decision and Control, San Antonio, Tex., USA, December 1993, pp. 424 to 429. A method for the motion control of robots is also described there, which is based on the theory of sliding mode control. A control device in particular is described there which allows the exact following of the gradients of a virtual harmonic potential field by a robot.

Since a mobile robot or manipulator follows a previously globally planned reference route to the target point "blindly", so to speak, sensor systems and contact switches are used which stop the robot when an obstacle has been detected dangerously close to the reference route. For example, the use of ultrasonic sensors is known to prevent collisions between a mobile robot and unknown obstacles (see J. Borenstein and Y. Koren: "Obstacle Avoidance with Ultrasonic Sensors" in IEEE Journal of Robotics and Automation", vol. 4, No. 2, Apr. 2, 1988, pp. 213 to 218). However, a simple "trial and error" strategy is proposed there, wherein the robot continues to attempt to pass laterally by an obstacle, because of which an even movement is not possible.

To prevent collisions between mobile robots and obstacles, the use of a local navigation level which reacts to local information regarding the workspace or the close vicinity of the robot and underlies the global path planning level is more advantageous. The local information can be obtained by sensors, for example video cameras, ultrasonic sensors or radar.

Thus, since global path planning can hardly be accomplished or not at all in real time because of its large requirements for computing time on one hand and, on the other hand, local reactive navigation cannot assure reaching the target point for reasons of the generally limited knowledge of the workspace, a combination of global path planning with a local reactive navigation system is advantageous.

Such an autonomous navigation system for a mobile robot or manipulator was introduced by Bruce H. Krogh and Charles E. Thorpe in "Integrated Path Planning and Dynamic Steering Control for Autonomous Vehicles" at the IEEE Conference on Robotics and Automation in San Francisco in 1986 and published in the Conference Proceedings on pages 1664 to 1669. An integrated path planning and dynamic steering control for a mobile robot is proposed there, which combines global path planning with local navigation on two hierarchical levels into a navigation system with a real-time feedback for autonomous vehicles in only insufficiently known work spaces. The path planning detects so-called critical points along a global reference route from predetermined information and measuring data of a sensor system not described in detail. The hierarchically underlying local navigation level reacts to new data of the sensor system and takes over local movement direction to prevent collisions with obstacles. The respectively next critical point among the critical points to be approached in sequence is selected as an intermediate target point when the robot nears the previous critical point. If the next critical point is not "visible" from the momentary position, in particular because an obstacle lies between them, a corner or an edge of the obstacle which lies closest to the desired critical point is selected as the next temporary intermediate target point.

To guide the robot around obstacles on a collision-free path, a computing method is employed which is based on the generalized potential field approach. An attractive potential is calculated for the intermediate or the temporary intermediate target point and a repulsive potential for the obstacle. The attractive and repulsive potentials result in a potential field whose gradient is given to the motion control level as the desired trajectory. Appropriate calculations are then performed in a fixed workspace coordinate system.

The integrated path planning and dynamic steering control for a mobile robot proposed by Krogh and Thorpe, and in particular the local navigation level based on the "Theory of Generalized Potential Fields" described there has a number of disadvantages:

When forming the generalized potential field, it is possible that the repulsive potential of the obstacle and the attractive potential of the intermediate target point cancel each other out. Although the robot does not come to a halt, since the traveling speed of the robot is taken into consideration in the calculation of the generalized potential field, limit cycles can occur when the robot moves directly toward a corner or edge of the obstacle. In this case the repulsive potential at first overcomes the attractive potential and the robot moves away from the corner or edge selected as the temporary intermediate target point. After some time the robot has moved far enough away from the obstacle for the attraction to overcome the repulsion again and the robot moves toward the corner or edge of the obstacle, but only until the repulsion again becomes greater than the attraction and the cycle starts anew. In the end the robot only moves back and forth and it is necessary to provide an overriding strategy to end such a limit cycle.

In narrow thoroughfares with lateral boundaries, for example in narrow corridors, it is possible for oscillations based on the generalized potential field to occur in the course of the dynamic steering control. If the robot slightly deviates from the globally planned reference route in the center between the lateral boundaries, the repulsive potential of the closer boundary is greater and the robot moves in the direction of the boundary which is farther away. Because of it mechanical inertia, however, it passes through the center between the lateral boundaries and now encounters repulsion from the other boundary. These oscillations around the ideal reference route in the center between the lateral boundaries can build up into complete instability.

Although the consideration of measured data of a sensor system are generally mentioned in the previously mentioned article by Bruce H. Krogh and Charles E. Thorpe, it is not explained in detail how these measured data are employed for collision avoidance. The described simulations only refer to the avoidance of collision with convex obstacles. How the known navigation system reacts to concave obstacles is not described.

Since in principle a repulsive potential is calculated for each obstacle, a large computing effort is generated and the already described danger of limit cycles and oscillations is increased.

All calculations are performed in a workspace coordinate system. Since the required conversions, in particular of measured data of the sensor system from robot coordinates into workspace coordinates, contain errors, uncertainties are created in the collision avoidance.

The disadvantages of the potential field method have been extensively explained in an article by Y. Koren and J. Borenstein, entitled "Potential Field Methods and Their Inherent Limitations for Mobile Robot Navigation", which was published on pages 1398 to 1404 of the Proceedings of the 1991 IEEE International, Conference on Robotics and Automation in Sacramento. The authors come to the conclusion that the potential field method has considerable and probably unsolvable disadvantages which appear to make it unusable in an autonomous navigation system for a mobile robot or manipulator.

An autonomous navigation system for a mobile robot which moves in a workspace from a starting point to a predetermined target point is known from European Patent Publication EP 0 358 628 A2. The robot has a sensor system which monitors the vicinity of the robot or the workspace and provides measured data regarding the position of obstacles within its range. An area of the work space in which an obstacle was detected is marked as an occupied area, wherein a safety zone is placed over the obstacle in such a way that at least the part of the obstacle detected by the sensor system is covered.

SUMMARY OF THE INVENTION

Accordingly, it is the object of the invention to develop a navigation system of the type mentioned at the outset, by means of which the robot or manipulator is guided through the workspace to a predetermined target point in spite of little or even incomplete information without colliding with known and unknown obstacles, wherein limit cycles, oscillatory movements and restless movement behavior in particular, such as can occur with the known methods, are prevented.

This objective is attained in an autonomous navigation system for a mobile robot or manipulator.

The autonomous navigation system in accordance with the invention utilizes a hierarchical system architecture with a global path planning level and an underlying navigation level. In accordance with one of the known methods, the path planning level determines a global reference route to the target point. Collisions with obstacles are prevented by the local navigation level and the robot is safely guided to the target point. A sensor system monitors the workspace or the vicinity of the robot. Although the entire size of the obstacle cannot be detected because of the limited range of the sensor system, the measured data of the sensor system of the navigation level make it possible to react locally and to avoid unknown obstacles in particular. The navigation level continuously calculates a virtual harmonic potential field whose gradient determines the motion vector of the robot. The control commands for the drive and steering systems of the mobile robot are derived from this.

The measurements of the sensor system take place in the robot coordinate system. The virtual harmonic potential field used for local navigation is also calculated in the local robot coordinate system. By means of this the local navigation becomes independent of the position of the robot in the workspace coordinate system. In a navigation system like, for example, the previously mentioned integrated path planning and dynamic steering control for mobile robots proposed by Krogh and Thorpe, which performs all calculations in the global work room coordinate system, the quality always depends on the exactness of the available information regarding the topology of the workspace and known obstacles and regarding the momentary position of the robot. In comparison with this, a considerably greater reliability in the avoidance of collisions is achieved with the navigation system of the invention, and relatively inexact information regarding the topology of the workspace, known obstacles and the momentary position of the robot can be used. A sufficiently exact determination of absolute positions in incompletely known work spaces is one of the most difficult problems in the navigation of autonomous mobile robots. Besides known obstacles, it is possible to evade unknown obstacles without collisions with the help of the navigation system of the invention.

In contrast to the known navigation system proposed by Krogh and Thorpe, the invention does not use a generalized potential field, but a harmonic potential field for local navigation. Harmonic potential fields meet Laplace's equation and are divergence-free. No extrema away from the singular points occur. Because of this, a stop of the robot in local minima is dependably prevented. A further difference from generalized potential fields is that in the calculation of a harmonic potential field only the position of the robot, but not its speed is taken into consideration. By means of this it is assured that the trajectories are independent of the movement of the robot.

The calculation of the virtual harmonic potential field corresponds to the strategy for global path planning by means of virtual harmonic potential fields in workspaces of known topology and known obstacles, described in the already mentioned article by J. Guldner and V. Utkin. However, the required calculations of the virtual harmonic potential field are performed in the robot coordinate system. By means of this the robot has direct feedback regarding its vicinity via the sensor system and an extraordinarily great reliability regarding collision avoidance is assured.

The basic principle of the navigation of robots by means of virtual harmonic potential fields is the achievement of an attraction to the target point by a global minimum in the target point and repulsion by local maxima in the obstacles. The robot is guided collision-free to the target point following the negative gradient. Accordingly, the virtual harmonic potential field must be selected in such a way that all gradient lines intersect the safety zones of the obstacles only from the inside to the outside.

Furthermore, only one global minimum may be present in the target point in which all gradient lines terminate. Additional local minima away from the target point would lead to an undesired early abort of the operation and would have to be left by means of heuristic driving maneuvers.

With harmonic potential fields, extremes only occur in the charges themselves. If the negative point charge in the target point is greater than the sum of the positive charges in the obstacles, all gradient lines terminate in the global minimum as the target point.

Depending on whether one or several obstacles are detected by the sensor system in the vicinity of the robot, with the autonomous navigation system of the invention, the local navigation level executes the calculation of a virtual harmonic potential field on the basis of operations which are based on a common principle. This common principle provides that all operations are performed on the local navigation level in the robot coordinate system, that occupied and unoccupied areas of the work room are appropriately marked, that detected obstacles are covered by safety zones, that an intermediate target point is defined in an unoccupied area of the workspace and that a virtual harmonic potential field is calculated. If an obstacle is detected, a virtual harmonic potential field is calculated whose gradients the robot follows. If several obstacles are detected, either only one virtual harmonic potential field for the closest obstacle is also calculated or a resultant virtual harmonic potential field for the two closest obstacles is calculated whose gradients the robot again follows.

When detecting a single obstacle in the detection range of the sensor system, the following operations are performed:

First, the area of the workspace wherein the obstacles was detected is marked as an occupied area. Then, a safety zone is placed over the obstacle in such a way that at least the part of the obstacle detected by the sensor is covered. By means of this, a safe and collision free trip is assured in connection with a simple sensor system which only provides measuring data regarding the distance and the approximate position of obstacles. An intermediate target point in an unoccupied area of the workspace outside of the safety zone is now calculated. A virtual harmonic potential field is calculated for determining the control commands for the drive and steering system of the robot, whose gradient inside the safety zone has a component directed away from the obstacle and outside the safety zone a component directed to the intermediate target point. The robot follows the gradient of the virtual harmonic potential field. The gradient should have a finite curvature so that the robot can follow the gradient with finite adjustment effort and while taking its dynamics into consideration. In this way the robot following the gradient always moves toward the intermediate target point and not into the safety zone. The robot moves safely around the obstacle. Since outside the safety zone the gradient always has a component directed toward the intermediate target point, the robot always moves in the direction toward the intermediate target point and never moves away from the intermediate target point. Thus, no limit cycles occur.

The following operations are performed when several obstacles in the detection range of the sensor system are found:

First, the areas of the workspace in which the obstacles are located are marked as occupied areas. Then a safety zone is placed over the respective obstacles in such a way that at least the portion of the respective obstacle which was detected by the sensor system is covered. To find the most advantageous route between the obstacles, that unoccupied area between the obstacles or the safety zones is selected which is closest to global reference route and which is of sufficient size to allow the passage of the robot. It is now possible to define an intermediate target point in the selected unoccupied area of the workspace outside of the safety zones.

In view of a small computing outlay, it is essential that in the course of the subsequent operations only the two safety zones are taken into consideration which are immediately adjacent to the selected unoccupied area. In this way the computing effort is independent of the number of obstacles. A center line which is equidistant from these two selected safety zones and has a center zone on both sides whose width is less than the least distance between the selected obstacles or the associated safety zones is defined as the optimum passage. To determine the motion vector of the robot, a virtual harmonic potential field is calculated, taking into consideration the position of the robot in relation to the center zone, whose gradient has a component inside the safety zone which is directed away from the obstacle and outside of the safety zone is directed toward the intermediate target point, so that the robot following the gradient always moves toward the intermediate target point and not into the safety zones.

The consideration of the position of the robot relative to the center zone can take place in accordance with two variants which differ because of the computing operations for determining the resultant virtual harmonic potential field.

In the first variant, when the robot is in an area outside the center zone, only one virtual harmonic potential field for the respectively closest obstacle or the closest safety zone is calculated separately, making reference to the intermediate target point and taking into consideration the respective safety zone. To determine the motion vector of the robot a resultant virtual harmonic potential field is calculated by means of weighted linear superposition of the two said potential fields.

In the second variant, respectively one virtual harmonic potential field is continuously calculated for the two closest obstacles, making reference to the intermediate target point and taking into consideration the respective safety zone. To determine the motion vector of the robot, the two virtual harmonic potential fields are weighted and linearly superimposed to form a resultant harmonic potential field, wherein the sum of the weights is one.

If the robot is in an area outside of the center zone, the potential field for the closest obstacle is marked with the weight one and the potential field for the obstacle located farther away with the weight zero.

If the robot is in the center zone, the two weights are selected to be not equal to "zero". The two weights are preferably selected proportionally to the distance of the robot from the center line, wherein their sum is one.

By the weighted superposition of the virtual harmonic potential fields when the robot stays in the center zone it is achieved that in this case the effect of the repulsive potentials of the boundaries approximately cancel each other out and the effect of the attractive potential of the intermediate target point is dominant. Because of this an extremely smooth motion behavior which is free of oscillations is achieved even in narrow passages.

Because of the selection of the weights in connection with the superposition of the two virtual harmonic potential fields proportionally to the instantaneous distance of the robot from the centerline, wherein the sum results in one, it follows that each potential field is given the weight 0.5 when the robot is on the center line. In that case the gradient of the resultant virtual harmonic potential field points exactly along the center line. Because of this, oscillations are prevented and the greatest possible reliability in the avoidance of collisions and an optimal use of the available unoccupied space are achieved.

It is possible, for example, to use a division into a grid-like structure to monitor the vicinity of the robot or the workspace, such as is used in the previously mentioned integrated path plan and dynamic steering of a mobile robot proposed by Krogh and Thorpe.

A sensor system is preferably used in connection with the invention which divides the vicinity of the robot or the workspace into sectors and monitors it sector by sector, wherein the navigation level marks a sector containing an obstacle as being occupied and defines the intermediate target point in an unoccupied sector. Suitable sensor systems are known, for example ultrasonic systems, and are therefore easy to implement.

Such a sensor system can have a number of sensors which monitor the vicinity of the robot or the workspace of the robot sector by sector and transmit measured data regarding the position and/or the movement of obstacles in the individual sectors to the navigation level. The edges of the sensors can overlap to improve collision safety and to compensate for inaccuracies of the sensor system. Such a system can also have only one sensor which scans the sectors sequentially, for example a rotating sensor or a phase array.

The sensor system is preferably placed on the robot when operating in a large, partially unknown or changing workspace. With a robot or in particular a manipulator operating in a work space which is limited and easy to survey, the sensor system can also be mounted in a position in the workspace.

The intermediate target point can be selected in accordance with various principles. The intermediate target point is preferably defined in an unoccupied sector which is adjacent to the occupied sector(s) through which the global reference route was determined. The intermediate target point is preferably located approximately at the end of the range of the sensor system, i.e. approximately at the edge of the "visual range" of the sensor system.

However, it is also possible to define the intermediate target point in such a way that it is located in the area of the reference route, outside of the safety zones and outside of the range of the sensor system. Although it can occur in connection with such a definition of the intermediate target point that it is placed on an unknown obstacle, there is no danger of a collision, since the safety zones cover the entire area of the obstacles in the vicinity of the robot which is monitored by the sensor system.

With the autonomous navigation system of the invention the safety zones are preferably designed as safety ellipses which are easy to adapt to various shapes of the obstacles and can also cover concave obstacles. The calculation of the virtual harmonic potential fields is greatly simplified when safety ellipses are used.

The collision safety can be further improved and the motion can be made more even if the safety zones are surrounded by expanded safety zones which are determined by taking into account the traveling speed and dynamics of the robot, so that evasion is still possible, even if a robot enters an expanded safety zone, without the actual safety zone being violated.

The control commands for the drive and steering systems must take place in the configuration space coordinate system of the robot, i.e. for example in the form of the steering angle and speed of the steering wheel or in the form of the two speeds of the parallel drive wheels or chains. Different ways to accomplish this are possible:

With the first option, the measured data of the sensor system is collected in the robot coordinate system specific to the robot and the navigation level calculates the virtual harmonic potential field in the Cartesian space of the robot coordinate system, and transforms it into control commands in the configuration space of the robot for the drive and steering systems.

In a second option the measured data of the sensor system is collected in the robot coordinate system specific to the robot and transformed into the configuration space of the robot coordinate system; the navigation level calculates the virtual harmonic potential field in the configuration space of the robot coordinate system and in this way directly defines the control commands for the drive and steering systems.

In a third option the measured data of the sensor system is collected in the workspace coordinate system and transformed in the Cartesian space of the robot coordinate system; the navigation level calculates the virtual harmonic potential field in the Cartesian space of the robot coordinate system and transforms it into control commands for the drive and steering systems in the configuration space of the robot coordinate system.

In a fourth option the measured data of the sensor system is collected in the workspace coordinate system and transformed in the configuration space of the robot coordinate system; the navigation level calculates the virtual harmonic potential field in the configuration space of the robot coordinate system and in this way directly defines the control commands for the drive and steering systems.

The non-holonomic kinematics and the size of the robot are preferably taken into consideration in the configuration space of a mobile robot. The coordinates of the joints and the size of the links of the manipulator are preferably taken into consideration in the configuration space of a manipulator. In the course of transferring the introduced principles for the autonomous navigation of mobile robots on a flat surface to the n- dimensional configuration space of a manipulator with n degrees of freedom, care must be taken that, for example, safety ellipses change into safety hyper-ellipsoids and the calculation of the virtual harmonic potential field must be adapted to the dimensions of the respective room, as described in detail in the already mentioned article by Guldner and Utkin.

BRIEF DESCRIPTION OF THE DRAWING FIGURES

The invention will be explained in detail below by means of an exemplary embodiment, making reference to the attached drawings, including:

FIG. 1, a schematic structural view of the navigation system of the invention for a mobile robot;

FIG. 2, a schematic representation of the relationship between a robot coordinate system and a fixed workspace coordinate system;

FIG. 3, a schematic representation of the measured data collected by the sensor system;

FIG. 4, a sensor system in which the vicinity of the robot or the workspace is divided into sectors and are monitored sector by sector;

FIG. 5, schematically the determination of an intermediate target point and a safety zone in the course of detecting an obstacle;

FIG. 6, schematically the determination of the intermediate target point and a safety zone in the course of detecting two obstacles;

FIG. 7, a detailed schematic representation of the construction of a safety ellipse for the visible portion of an obstacle;

FIG. 8, a detailed schematic representation of the construction of two safety ellipses for the visible portion of two detected obstacles;

FIG. 9, schematically the gradient of a virtual harmonic potential field;

FIG. 10, schematically the center line with a center zone on both sides between two safety ellipses;

FIG. 11, the gradient of a resultant virtual harmonic potential field in the transformed space for two safety ellipses, and FIGS. 12a and 12b, two embodiments of a mobile robot with thricycle kinematics.

DETAILED DESCRIPTION OF THE PREFERRED EMBODIMENTS

Figure 1:
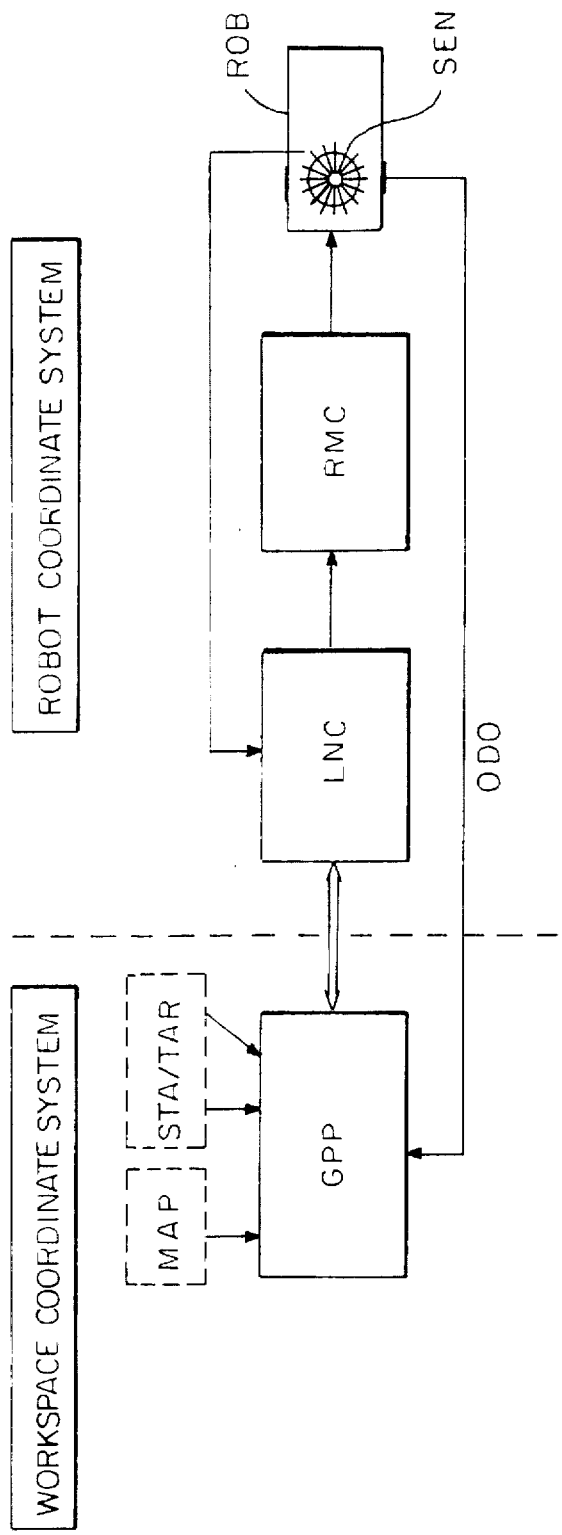

A structural representation in FIG. 1 shows a schematic overview of the tasks and interactions of system components of the navigation system of the invention for a mobile robot.

A global path planning level GPP plans a reference route RR from a starting point STA to a target point TAR from a priori known data regarding the topology of a workspace and known obstacles filed in a memory MAP as well as measured data ODO regarding an already traveled path. The data for the starting point STA and the target point TAR are input via an input device (not shown) and stored. The measured data ODO is determined by appropriate measuring devices of a robot ROB and relate in particular to the distance covered by each individual wheel on the already traveled path. The length and orientation of the traveled distance segments can be determined from this. The instantaneous position of the robot ROB in relation to a fixed workspace coordinate system is also determined from the measured data ODO and the data of the starting point STA.

The determination of the reference route on the global path planning level GPP can take place in accordance with known methods for global path planning, such as the previously mentioned integrated path planning and dynamic steering control for a mobile robot proposed by Krogh and Thorpe.

Information regarding the planned reference route RR are transferred to a local navigation level LNC, which continuously calculates the most advantageous trajectory for the motion of the robot from the instantaneous position of the robot ROB and the locally measured data of a sensor system SEN, taking into consideration the obstacles detected by the sensor system, and determines from this control commands for the drive and steering systems of the robot. The data determined in the local navigation level LNC can be transmitted back to a path planning level GPP and used, for example, to complete the information regarding the topology of the workspace and the obstacles contained therein.

A motion control level RMC executes the control commands to the drive and steering systems of the robot and forwards corresponding adjustment orders to the drive control or the drives, customarily controlled electric motors. Here, and in the following claims, "robot" includes a manipulator.

In the actual execution, the global path planning level GPP, the local navigation level LNC and the motion control level RMC are respectively microcomputers or parts of a computer or of a computer program. The path planning level GPP is hierarchically located above the navigation level LNC.

The areas of the autonomous navigation system in which calculations are performed in a fixed global workspace coordinate system are located to the left of a dotted line in FIG. 1. On the right side of the dotted line are the areas of the autonomous navigation system in which calculations are performed in a local robot coordinate system related to the robot.

Figure 2:
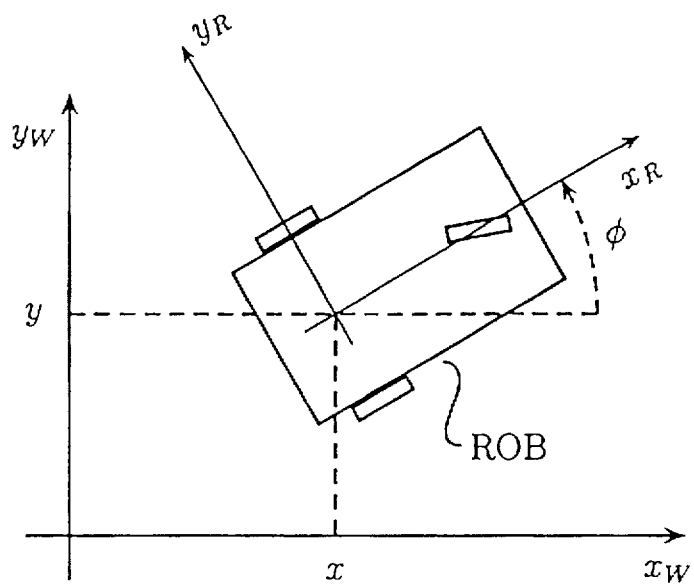

The relationship between the robot coordinate system related to the robot ROB with the Cartesian coordinate axes $x_R$, $y_R$, and the workspace coordinate system related to the workspace with the Cartesian coordinate axes $x_W$, $y_W$ is represented in FIG. 2. The robot ROB can have a thricycle configuration, which is shown in detail in FIG. 12. The absolute position of the robot ROB in the workspace is denoted by x,y, the absolute orientation by the angle $\phi$.

Figure 3:
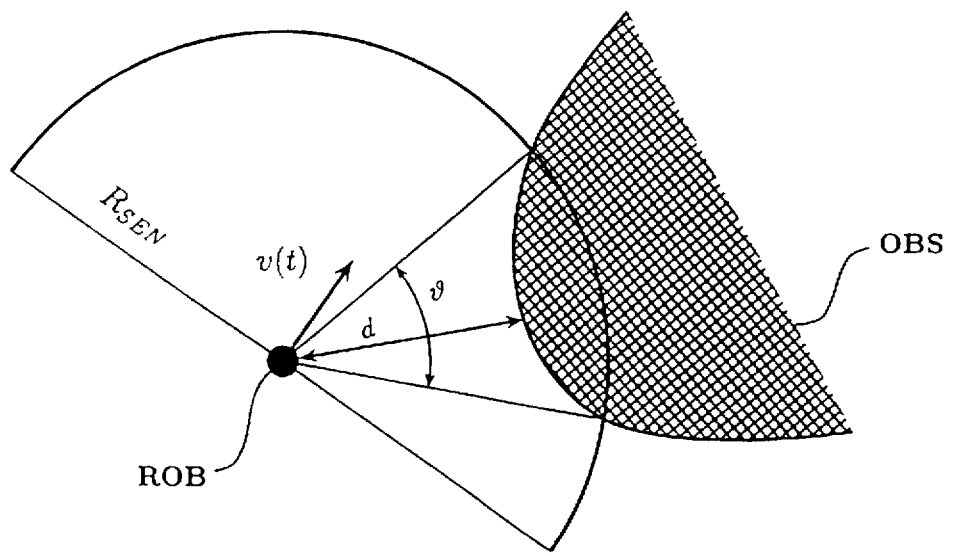

In FIG. 3 a sensor system for a mobile robot, represented as a mass point, in the plane is shown, which monitors the work space within its range $R_{SEN}$ and provides measured data regarding the distance d and position of the obstacle OBS in the workspace to the local navigation level LNC. The basic functions of the sensor system or its measured data are the following:

a. The sensor system has a defined range $R_{SEN}$ and an angle of beam of 180° in the direction of the motion vector v(t) of the robot ROB.

b. The shortest distance d between the robot ROB and the obstacle OBS is measured and the width $\delta$ of the obstacle visible within the range $R_{SEN}$ of the sensor system is determined.

c. The measured data of the sensor system are periodically scanned and forwarded to the navigation level LNC. The scanning intervals have been selected such that new control commands for the drive and steering systems of the robot can be transmitted in each cycle.

The measured data of the sensor system are needed on the local navigation level LNC for calculating safety zones for the obstacle(s), to define an intermediate target point and to calculate a virtual harmonic potential field whose gradient the robot follows.

Measured data from all sensors are available in each scanning time interval, which are periodically processed to determine control commands for the drive and steering systems of the mobile robot. To assure continuous transitions, the gradient of the virtual potential field is smoothed by means of a low-pass filter. At high speeds of travel of the robot and with large time intervals it is advantageous that the measured data of the sensors are corrected prior to or during the determination of the intermediate target point, the safety zone and the virtual harmonic potential field in accordance with the distance traveled in the meantime. The respective instantaneous position of moving obstacles in relation to the robot is determined in an analogous manner when the said calculations are performed.

Figure 4:
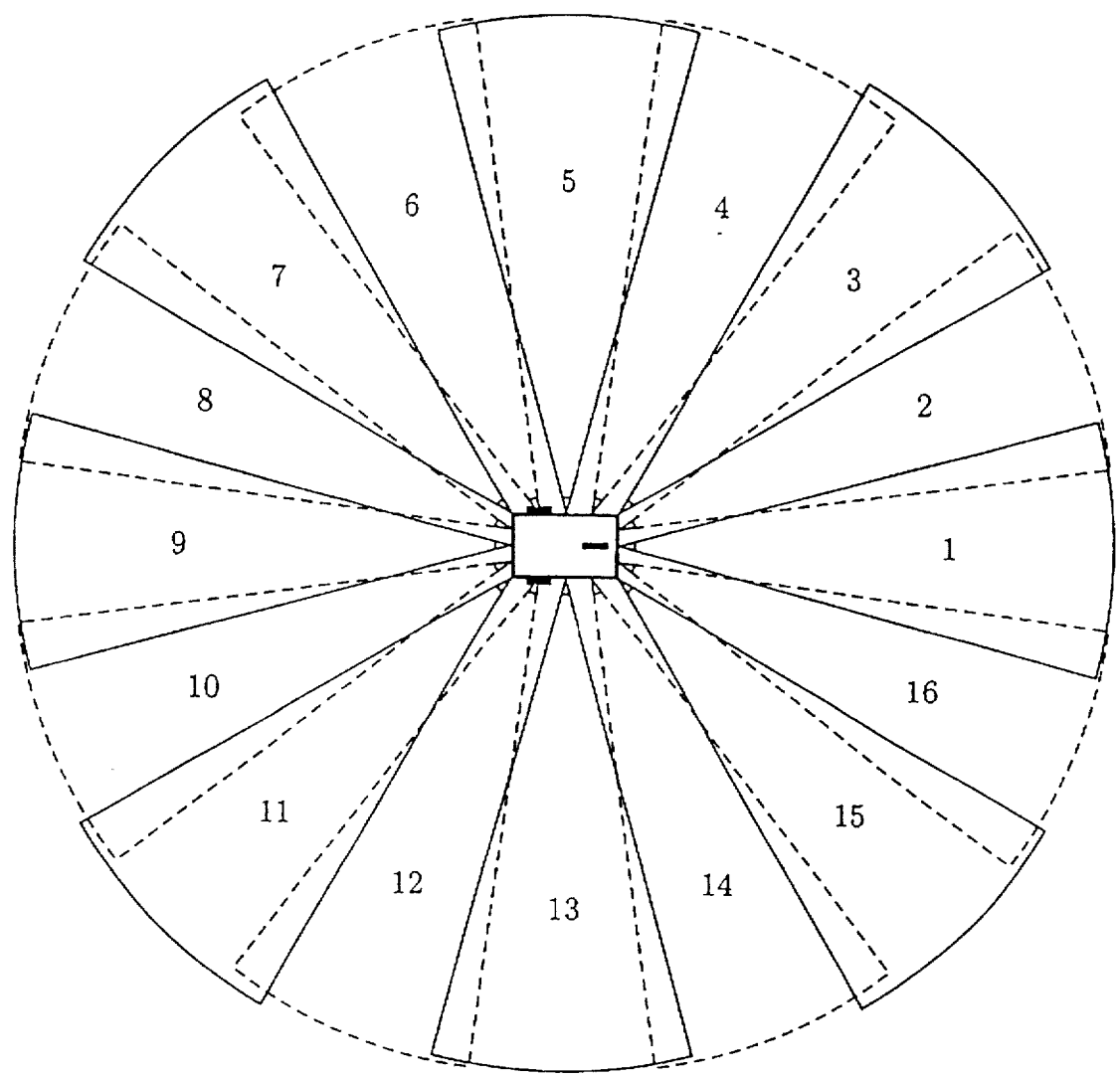

FIG. 4 shows the details of a sensor system SEN having a number of sensors, in the illustrated example sixteen ultrasonic sensors which are symmetrically arranged in a ring around the robot. It is achieved by means of the symmetrical distribution of the sensors over the circumference of the robot that there are no limitations of the direction of travel. It is therefore also possible to move backward without having to change the calculating method.

The sensor system SEN monitors the vicinity or the work space of the robot by sectors and transmits measured data regarding the position and/or movement of obstacles in the individual sectors to the local navigation level LNC. Each sensor covers a sector with its ultrasonic cone. The sectors slightly overlap in the edge areas for increasing the reliability.

For example, an individual ultrasonic sensor has an integrated transmitter and receiver. To detect obstacles, short ultrasonic signals are transmitted and their return time is measured, from which the distance from the obstacle is calculated. The corresponding area of the sector is then considered to be occupied. If no reflected ultrasonic signal is received within a prescribed return time, the corresponding sector is considered to be unoccupied. The range $R_{SEN}$ of the sensor is defined by the prescribed return time. The position, shape and extent of an obstacle can only be determined inaccurately with a sensor system of such simple construction. It is therefore essential for the navigation system in accordance with the invention that it is possible to assure safe avoidance of collisions in the workspace in spite of the inaccurate measured data of the sensor system. In particular, the safe motion around obstacles which have a concave contour, viewed from the position of the sensor system of the robot is possible.

However, the sensor system can also have only one sensor which sequentially scans the sectors, for example a rotating sensor or a "phased array", as is known from radar technology.

Figure 5:
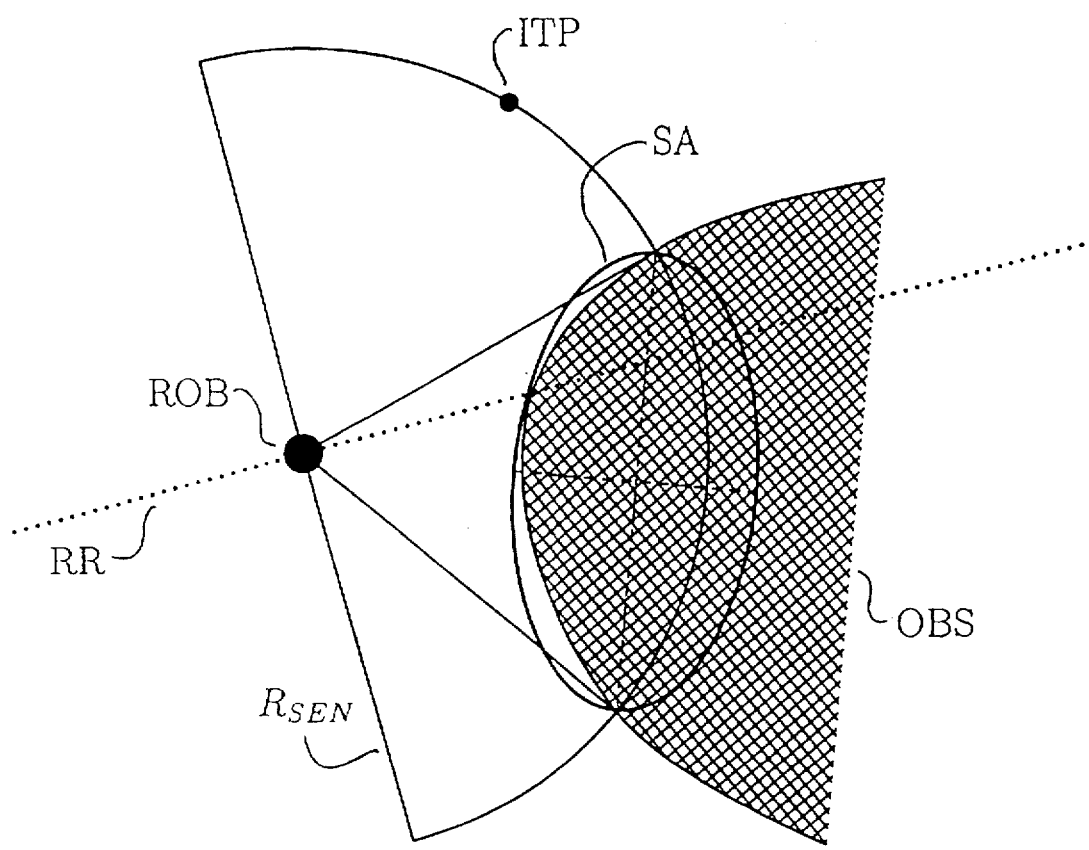

FIG. 5 shows the principle of determining the safety zone SA and the intermediate target point ITP in the course of detecting an obstacle OBS in the direction of the reference route RR of the robot ROB represented in the form of a mass point. The area of the workspace in which the obstacle was detected is marked as occupied and a safety zone SA for the detected obstacle OBS is determined. In the simplest case safety zones can be safety circles covering the entire possible area of the obstacle.

The safety zone SA in FIG. 5 is designed as a safety ellipse, because ellipses can be better matched to the shape of an obstacle and in this way unnecessary travel of the robot is avoided. In the illustrated example the large major axis of the safety ellipse is determined by the two intersection points of the obstacle OBS with the range $R_{SEN}$ of the sensor system. The short minor axis of safety ellipse is determined by the shortest distance of the robot ROB from the obstacle OBS. A safety ellipse SA can be constructed by means of these three points. The intermediate target point ITP is placed into an adjacent unoccupied area at the edge of the range $R_{SEN}$ of the sensor system.

Figure 6:
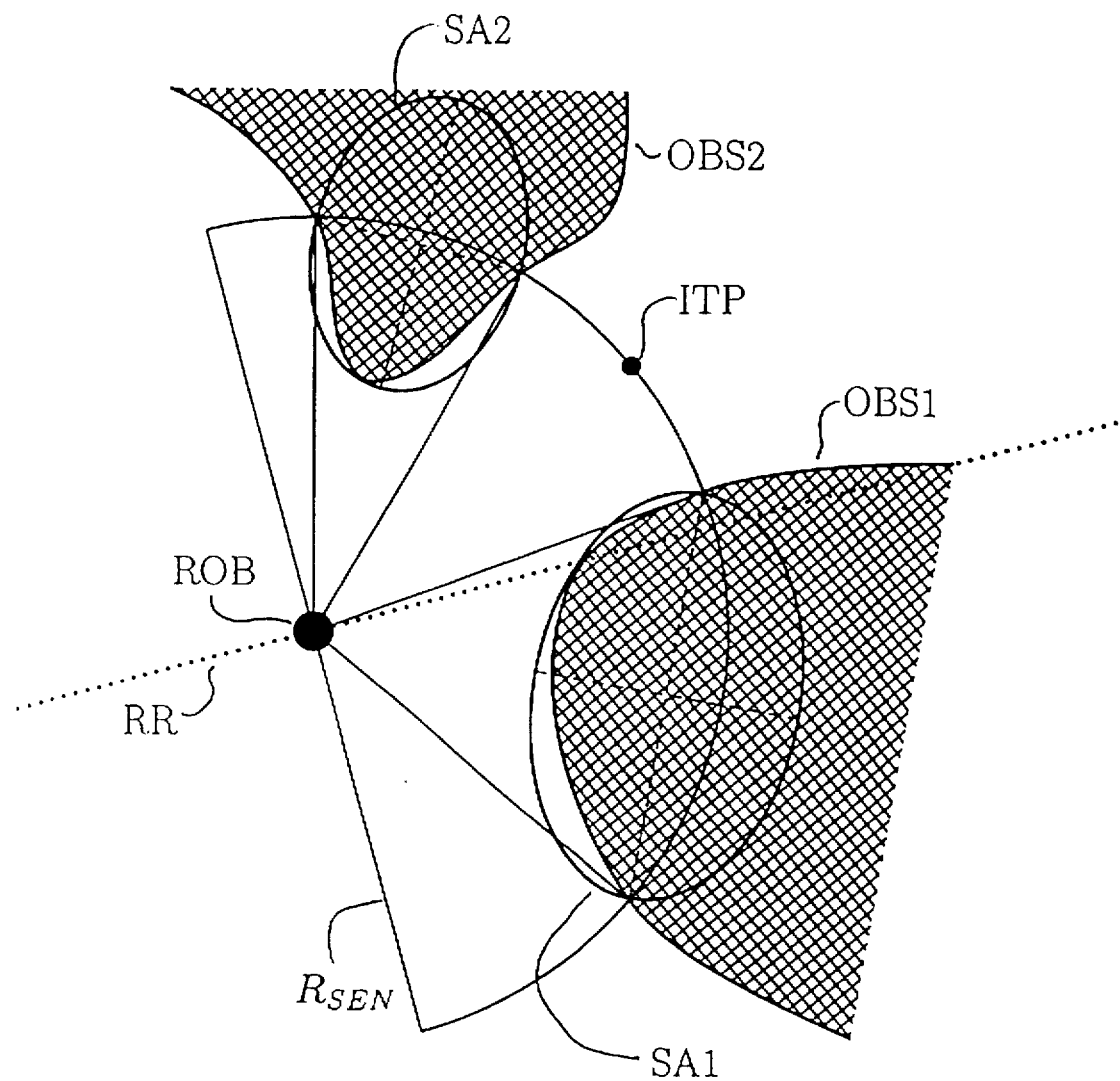

FIG. 6 shows the principle of determining safety zones SA1 and SA2 and the intermediate target point ITP in the course of detecting two obstacles OBS1 and OBS2, of which the obstacle OBS1 is located on the reference route RR of the robot ROB. In FIG. 6 the unoccupied area between the two obstacles is large enough for the passage of the robot ROB. The intermediate target point ITP is therefore placed in the unoccupied area between the two obstacles at the edge of the range $R_{SEN}$ of the sensor system. The safety zones SA1 and SA2 are again constructed in the form of safety ellipses around the respectively visible part of the two obstacles OBS1 and OBS2 and are constructed in a similar manner as in FIG. 5.

Figure 7:
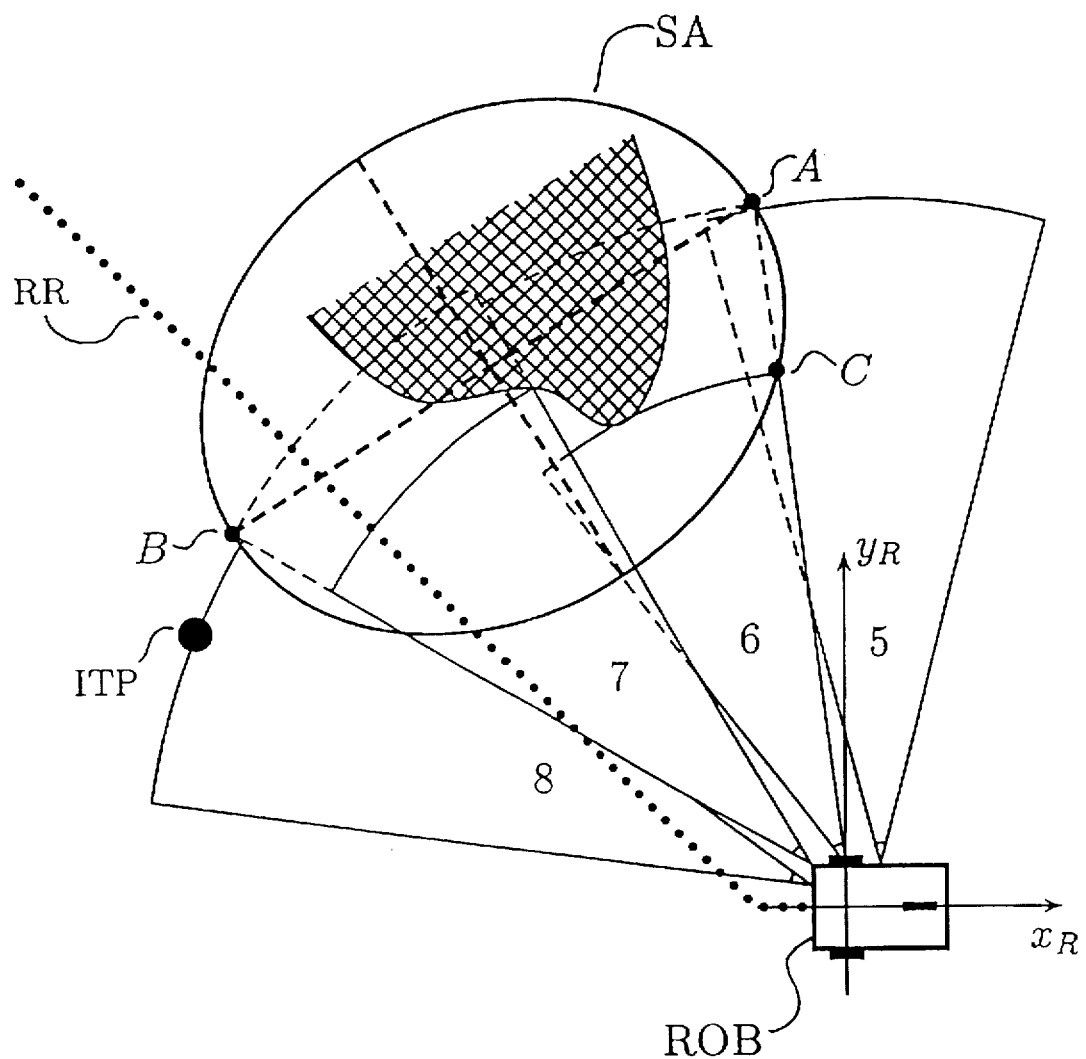

FIG. 7 shows the determination of the intermediate target point ITP and the safety zone SA in the course of detecting an individual obstacle OBS by the sensor system which monitors the vicinity of the robot by sectors. The robot follows the dotted, globally planned reference route RR leading through the sector "7". An obstacle OBS within the range $R_{SEN}$ of the sensors is detected in sectors "6" and "7". The sectors "6" and "7" are therefore considered to be occupied. The adjacent sectors "5" and "8" are considered to be unoccupied. The intermediate target point ITP is placed into one of the adjoining unoccupied sectors at a distance from the robot ROB corresponding to the range $R_{SEN}$ of the sensors. Optimization of the travel time is achieved in that the sector "8" instead of the sector "5" is selected as the unoccupied sector, because it adjoins the occupied sector "7" in which the reference route RR intersects the range $R_{SEN}$ of the sensors.

The safety ellipse SA around the obstacle OBS is constructed in such a way that it covers the entire possible area of the obstacle in sectors "6" and "7". Three points are considered for this, namely the two intersecting points A and B of the range $R_{SEN}$ of the sensors with the boundary lines of the occupied sectors which face away from the respective obstacle, and the point C at the edge of the occupied sector having the shortest measured distance from the obstacle.

Figure 8:
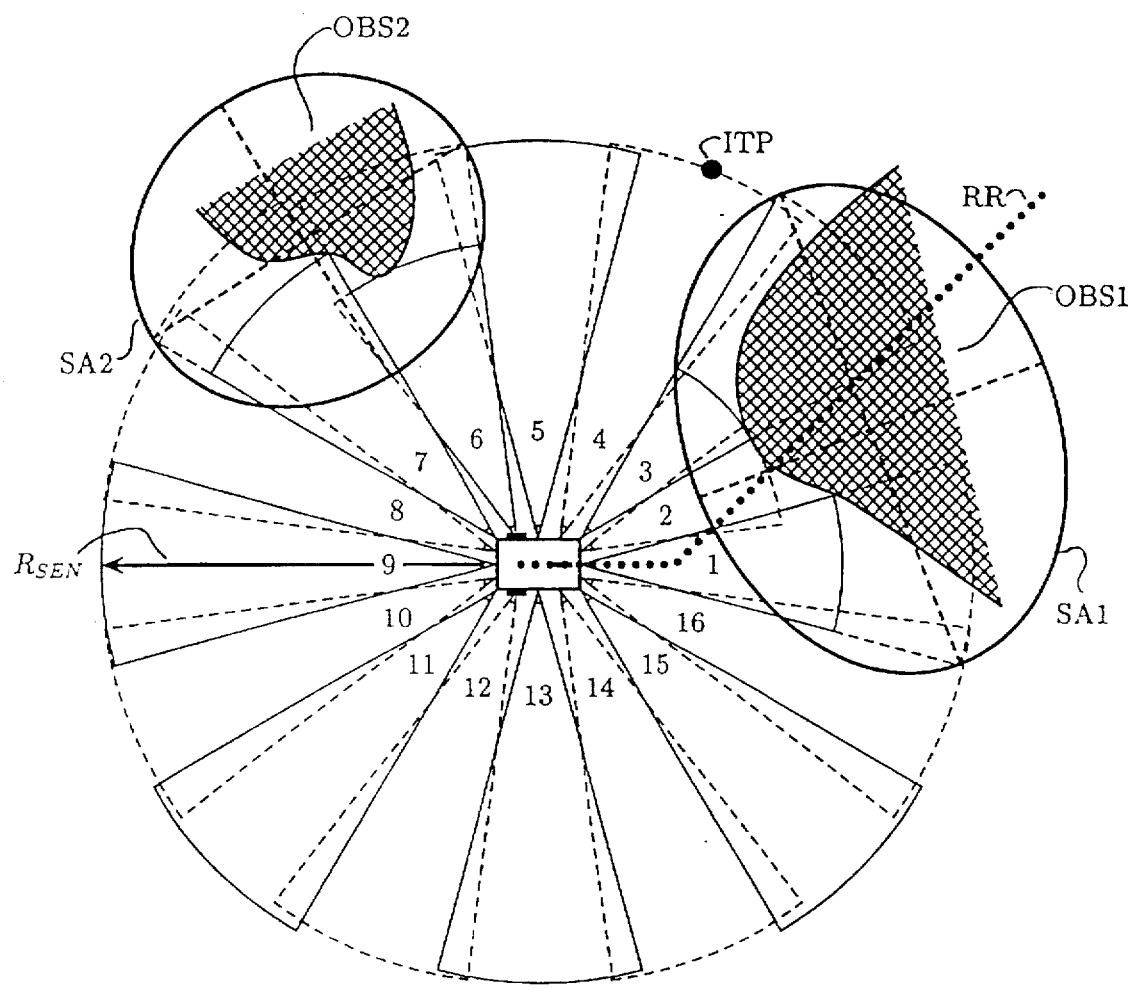

FIG. 8 shows the practical determination of the intermediate target point ITP and the safety zones SA1 and SA2 in the course of detecting two obstacles by a sensor system monitoring the vicinity of the robot by sectors. The dotted, globally planned reference route RR leads through the sectors "1", "2" and "3". In these sectors an obstacle OBS1 is detected within the range $R_{SEN}$ of the sensors. The sectors "1", "2" and "3" are therefore considered to be occupied. The adjoining sectors "16" and "4" are considered to be unoccupied.

The intermediate target point ITP is placed into one of the adjoining unoccupied sectors at a distance from the robot ROB corresponding to the range $R_{SEN}$ of the sensors. Optimization of the travel time is achieved in that the sector "4" instead of the sector "16" is selected as the unoccupied sector, because it adjoins the occupied sector "3" in which the reference route RR intersects the range $R_{SEN}$ of the sensors.

As can be seen, shape and size of the obstacle are of no consequence. For example, the same intermediate target point would have been also selected if there had been three small obstacles in each of the sectors "1", "2" and "3".

It can furthermore be seen that the sensor system also detects a second obstacle OBS2. Although the second obstacle OBS2 is located off the reference route RR, since the reference route RR was abandoned because of the first obstacle OBS1, it is necessary to determine whether the robot can pass between the two obstacles.

In the course of determining the safety ellipses around the two obstacles closest to the intermediate target point ITP, a search for occupied sectors, i.e. sectors in which obstacles had been detected, is performed in both directions, starting with the unoccupied sector "4". In FIG. 8 these are the sectors "1", "2," "3", as well as "6" and "7". The safety ellipses are constructed in a manner analogous to FIG. 7 in such a way that they each cover the entire possible area of the obstacles.

Figure 9:
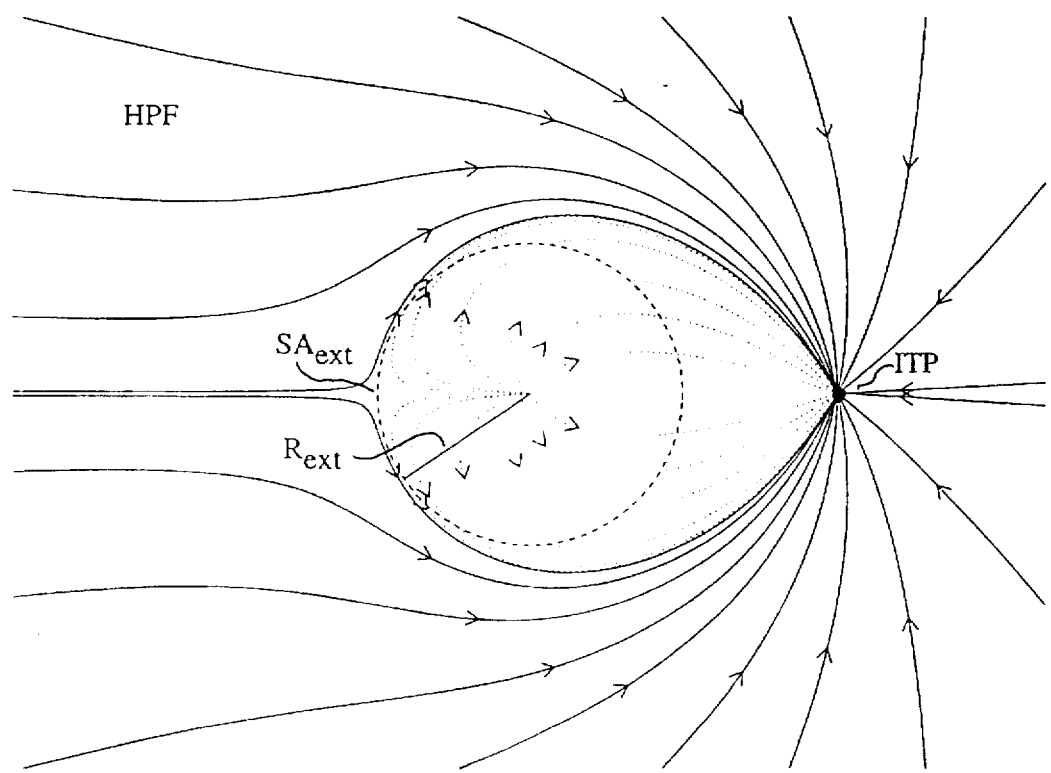

The gradient field of a virtual harmonic potential field HPF for the safety circle $SA_{ext}$, shown in dashed lines, with the extended radius $R_{ext}$ in the transformed space is illustrated in FIG. 9. For this purpose a mathematical coordinate transformation is performed in such a way that the safety ellipse is mapped into a circle of unit radius. To compensate for the motion of the robot towards the obstacle, the circle of unit radius is extended to the radius $R_{ext}$, taking into consideration the speed component of the robot in the direction of the center of the circle of unit radius and the maximum acceleration of the robot.

To calculate the virtual harmonic potential field HPF, the intermediate target point ITP in the mathematically transformed space is assigned a virtual unit charge, negative in the example. The center of the said extended safety circle with the radius $R_{ext}$ is assigned a virtual charge, in the example a positive charge q, which is calculated in accordance with the equation $$q = \frac{R_{ext}}{R_{ext} \cdot D},$$

where D is the distance between the two charges in the mathematically transformed space.

The harmonic potential field HPF obtained in this way has the property that its gradient intersects the extended safety circle $SA_{ext}$ only from the inside to the outside. Outside of the extended safety circle $SA_{ext}$ the gradient furthermore has a component which is always directed to the intermediate target point. The gradient of the calculated harmonic potential field HPF is mathematically transformed back into the original space, in the course of which the above mentioned properties of the gradient are maintained intact.

Figure 10:
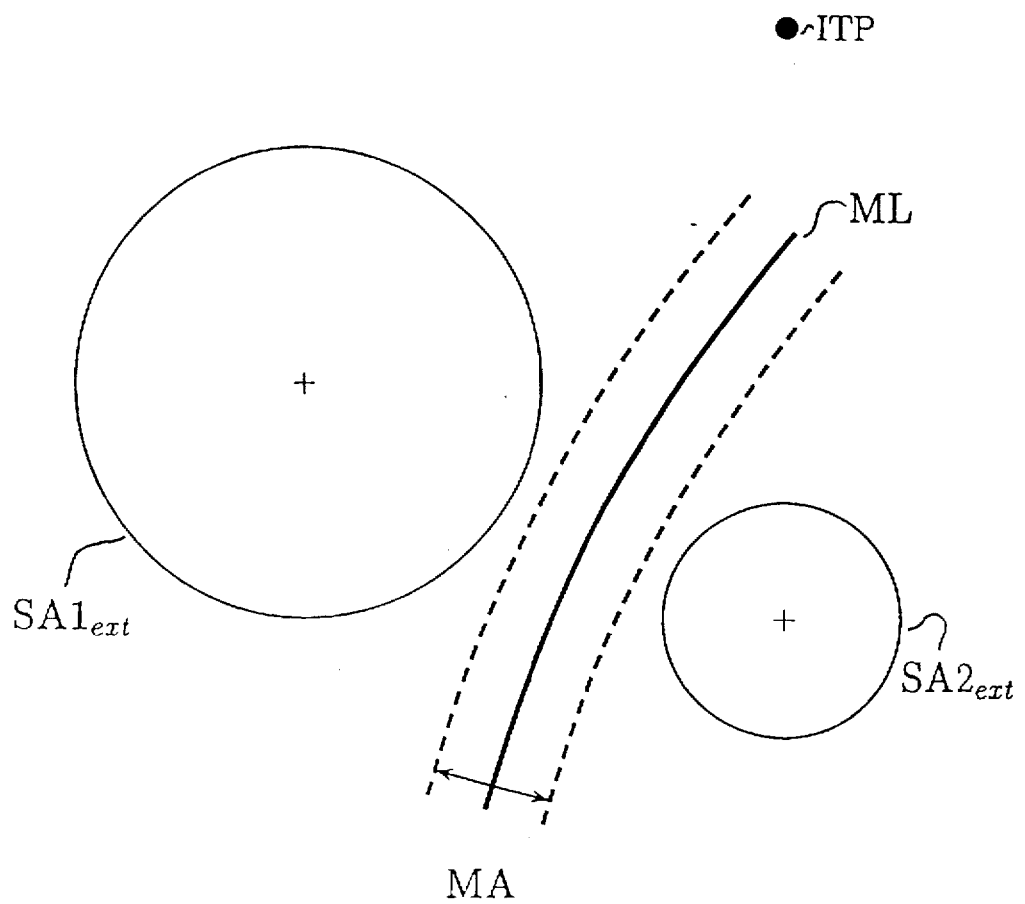

In FIG. 10 a center line ML is represented in the transformed space, which is equidistant to the extended safety circles $SA1_{ext}$ and $SA2_{ext}$ and has a center zone MA on both sides and whose total width is less than the smallest distance between the extended safety circles $SA1_{ext}$ and $SA2_{ext}$.

In the course of determining the resultant virtual harmonic potential field HPFR, the position of the robot in relation to the center zone MA in the transformed space is taken into consideration. If the robot is in an area outside the center zone MA, only the virtual harmonic potential field HPF for respectively the extended safety zone $SA1_{ext}$ or $SA2_{ext}$ of the closest obstacle OBS1 or OBS2 in respect to the intermediate target point ITP is calculated. If the robot is in the center zone MA, respectively one virtual harmonic potential field HPF1 and HPF2 is calculated for the two extended safety circles $SA1_{ext}$ and $SA2_{ext}$ in respect to the intermediate target point ITP. The resultant virtual harmonic potential field HPFR is determined by means of a weighted linear superposition of the two separately calculated virtual harmonic potential fields HPF1 and HPF2. In the process the respective weights are selected proportionally to the distance between the robot and the center line ML in such a way that their sum always is one.

Figure 11:
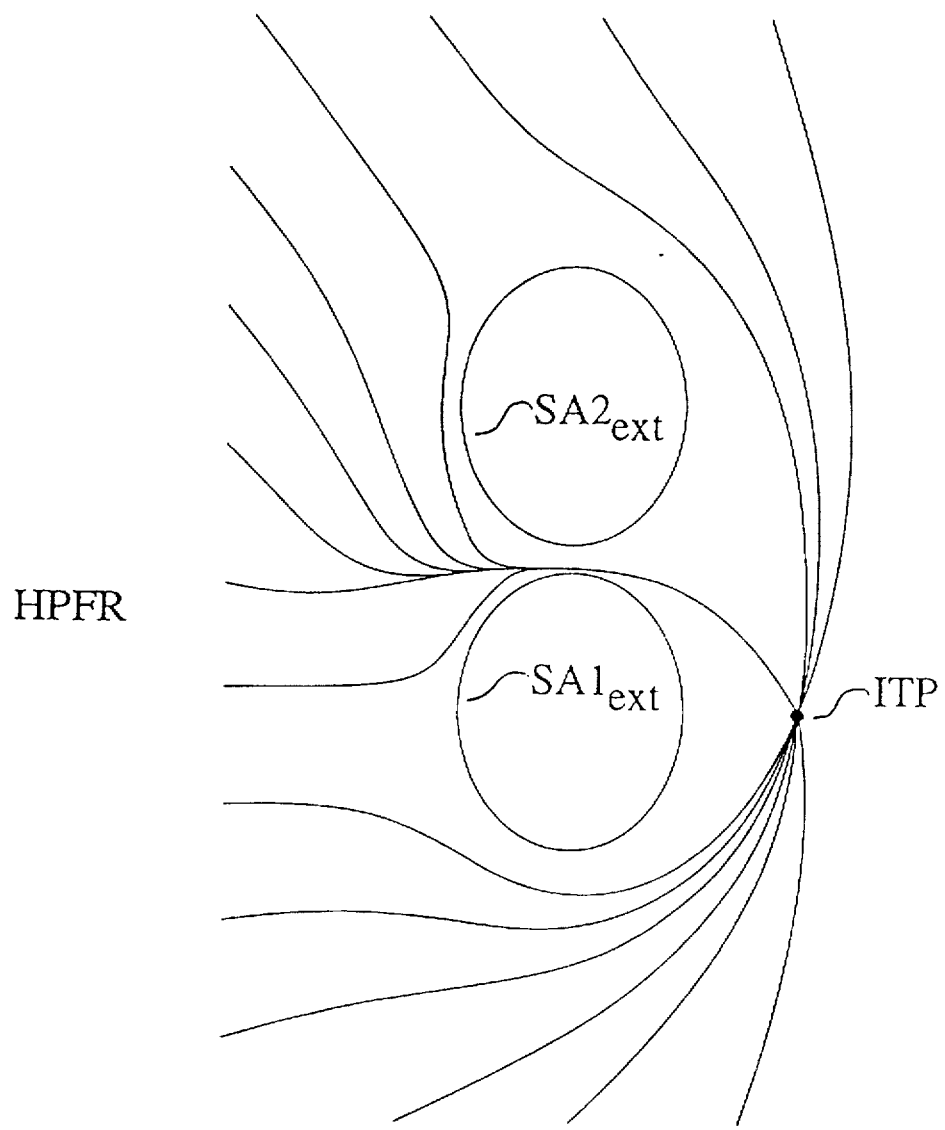

FIG. 11 shows the resultant virtual harmonic potential field HPFR for two safety circles $SA1_{ext}$ and $SA2_{ext}$. As can be seen, the gradient always has a finite curvature, which can be followed by the robot with finite adjustment effort. The robot is guided straight through the narrow passage between the safety zones without a possibility of oscillations occurring.

If the calculation of the virtual harmonic potential field is performed in a Cartesian coordinate system, the gradient determines the motion vector of the robot ROB. The gradient is converted into the configuration space of the robot, taking into consideration the kinematic properties and size of the robot and used for determining the control commands for the drive and steering systems of the mobile robot.

If the calculations for determining the gradient have already been performed in the configuration space coordinates of the robot, the said control commands can be directly derived from the gradient.

Most prototypes of mobile robots are equipped with thricycle kinematics and there are two kinematically equivalent thricycle configurations.

Figure 12A:
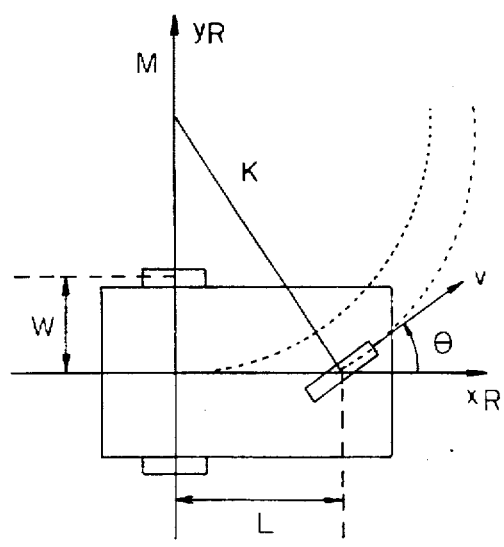

FIG. 12(a) shows a thricycle configuration with a steered and driven front wheel and two non-driven rear wheels with a fixed parallel orientation. In this thricycle configuration the driving speed v and the steering angle θ of the front wheel are to be commanded.

Figure 12B:
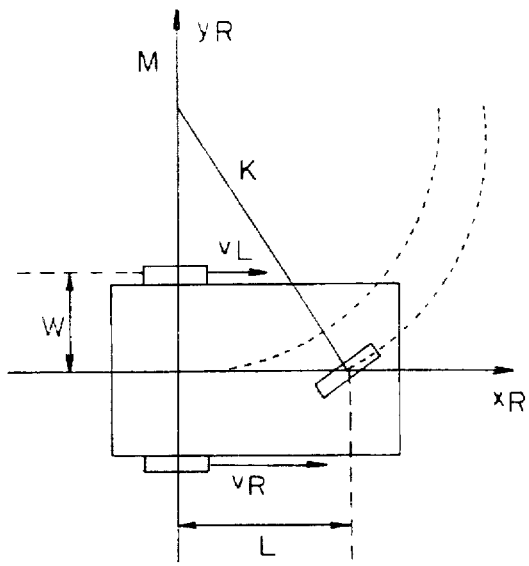

FIG. 12(b) shows a second thricycle configuration with two independently driven rear wheels of fixed orientation and a freely movable front wheel. In this thricycle configuration the two driving speeds $v_R$ and $v_L$ for the right and left rear wheel are to be commanded. The two configurations can be converted into each other by appropriate algebraic relationships.

Assuming a slip-free rolling of the wheels on the ground, the motion of such a three-wheeled robot for constant steering angles θ is described by circles which are shown by dotted lines in FIG. 12. The center M of such a circle is located on the $y_R$ axis of the robot coordinate system which is defined by the rear axle of the robot. The front wheel is placed at right angles on the connecting line with the circle center M. In FIG. 12 the circle radius of the traveled circle is indicated by K, the distance of the front wheel from the rear axle by L and half the wheelbase of the robot by W. The geometric relationships between the steering angle θ and the distance covered along the arc of the circle define the configuration space of the robot.

What is claimed is:

1. An autonomous navigation system for a mobile robot moving in a workspace from a starting point to a predetermined target point (TAR), comprising:

a global path planning level (GPP) comprising means to determine a global reference route (RR) to the target point (TAR) from data regarding a topology of the workspace and obstacles present therein known at a time of planning, as well as from measured data regarding an already traveled route in a workspace coordinate system ($x_W$, $y_W$), a sensor system (SEN) comprising means to monitor a vicinity of the robot (ROB) and the workspace and to provide measured sensor data regarding position and the movement of obstacles within a range ($R_{SEN}$) thereof, a local navigation level (LNC) hierarchically placed below the global path planning level (GPP), comprising means to continuously calculate a virtual potential field from the global reference route (RR), an instantaneous position of the robot, and measured data of the sensor system (SEN), and by means of the measured data of the sensor system (SEN) to determine control commands for drive and steering systems of the robot (ROB):

a motion control level (RMC) comprising means for executing control commands issued by the local navigation level (LNC) for the drive and steering systems of the robot and further comprising means for the local navigation level (LNC) continuously to perform, when an obstacle (OBS) is detected within the detection range ($R_{SEN}$) of the sensor system (SEN), the following operations in a robot coordinate system ($x_R$, $y_R$) relative to the robot (ROB), namely $a_1$) marking the area of the workspace in which the obstacle (OBS) was detected as an occupied area;

$b_1$) placing a safety zone (SA) over the obstacle (OBS) in such a way that at least a portion of the obstacle detected by the sensor system (SEN) is covered;

$c_1$) defining an intermediate target point (ITP) in an unoccupied area of the workspace outside the safety zone (SA);

$d_1$) calculating the virtual potential field as a harmonic potential field (HPF) for the determination of the control commands for the drive and steering systems of the robot (ROB), a gradient of which virtual potential field has inside the safety zone (SA) a component directed away from the obstacle (OBS) and outside of the safety zone (SA) has a component directed toward the intermediate target point (ITP), such that the robot (ROB) following the gradient always moves toward the intermediate target point (ITP) and not into the safety zone (SA);

wherein the means for the local navigation level (LNC) continuously to perform includes means for avoiding a plurality of obstacles (OBS1, OBS2, . . . ) and means for placing respective safety zones (SA1, SA2, . . . ) placed around each of the obstacles, and further comprises:

i) means for selecting a respective unoccupied area between the safety zones which is closest to a global reference route (RR) and which is of sufficient size to allow passage of the robot therethrough;

ii) means for considering in subsequent operations only two bordering safety zones (SA1, SA2) which are immediately adjacent to the selected unoccupied area; and iii) means for determining a center line (ML), which is equidistant to the two bordering safety zones (SA1, SA2) and has a center zone (MA) on both sides thereof, having a total width less than a least distance between the bordering safety zones (SA1, SA2).

2. An autonomous navigation system in accordance with claim 1, wherein the position of the mobile robot in relation to the center zone (MA) is taken into consideration in such a way that, when the robot (ROB) is in an area outside the center zone (MA), only respectively one virtual harmonic potential field for the closest obstacle or the safety zone (SA1 or SA2) is calculated in respect to the intermediate target point (ITP).

3. An autonomous navigation system in accordance with claim 2, wherein inside the center zone (MA) the weighting of the two virtual harmonic potential fields is selected proportionally to the instantaneous distance of the robot (ROB) from the center line (ML), and that the sum of the weights is one.

4. An autonomous navigation system in accordance with claim 1, wherein the position of the mobile robot in relation to the center zone (MA) is taken into consideration in such a way that, when the robot (ROB) is in the center zone (MA), respectively two virtual harmonic potential fields for the two closest obstacles (OBS1, OBS2) or the safety zones (SA1, SA2) are calculated separately each with respect to the intermediate target point (ITP) and the respective safety zone and a resultant virtual harmonic potential field (HPFR) is calculated for determining the control commands for the drive and steering systems of the mobile robot (ROM) or the drive joints of the manipulator by a weighted linear superposition of the two said potential fields, whose gradient has inside the selected safety zones (SA1, SA2) a component directed away from the respective obstacle (OBS1, OBS2)) and outside of the safety zones (SA1, SA2) has a component directed toward the intermediate target point (ITP), so that the robot (ROB) following the gradient always moves toward the intermediate target point (ITP) and not into the safety zones (SA1, SA2).

5. An autonomous navigation system in accordance with claim 1, wherein the position of the mobile robot in relation to the center zone (MA) is taken into consideration in such a way that respectively one virtual harmonic potential field is continuously calculated for the two closest obstacles (OBS1, OBS2), with respect to the intermediate target point (ITP) and taking into consideration the respective safety zone (SA1, SA2);

to determine the control commands for the drive and steering systems of the robot (ROB) or the drive joints of the manipulator, the two virtual harmonic potential fields are weighted and linearly superimposed to form a resultant harmonic potential field (HPFR), wherein the sum of the weights is one and wherein the gradient of the resultant virtual harmonic field (HPFR) has inside the selected safety zones (SA1, SA2) a component directed away from the respective obstacle (OBS1, OBS2) and outside of the safety zones (SA1, SA2) has a component directed toward the intermediate target point (ITP), so that the robot (ROB) following the gradient always moves toward the intermediate target point (ITP) and not into the safety zones (SA1, SA2), wherein if the robot (ROB) is in an area outside of the center zone (MA), the potential field for the closest obstacle (OBS1) is marked with the weight one and the potential field (HPF2) for the obstacle (OBS2) located farther away with the weight zero; or if the robot (ROB) is in the center zone (MA), the two weights are selected to be not equal to "zero".

6. An autonomous navigation system in accordance with claim 1, including means for employing the sensor system (SEN) to divide the vicinity of the mobile robot (ROB) or the workspace into sectors and to monitor the vicinity by the sectors, and means for the navigation level (LNC) to mark a sector containing an obstacle (OBS) or a safety zone (SA) as being an occupied sector and defining the intermediate target point (ITP) in an unoccupied sector.

7. An autonomous navigation system in accordance with claim 6, wherein the edge areas of the sectors overlap.

8. An autonomous navigation system in accordance with claim 6, wherein the sensor system (SEN) has a number of sensors which monitor the vicinity of the mobile robot (ROB) or the manipulator or the workspace by sectors and periodically transmit measured data regarding the position and obstacles in the individual sectors to the navigation level (LNC).

9. An autonomous navigation system in accordance with claim 6, wherein the sensor system has a sensor such as a rotating sensor or a "phased array", which sequentially scans the sectors.

10. An autonomous navigation system in accordance with claim 6, wherein the intermediate target point (ITP) is defined in an unoccupied sector adjoining the occupied sector(s).

11. An autonomous navigation system in accordance with claim 1, wherein the sensor system (SEN) is arranged on a mobile robot (ROB) or a manipulator.

12. An autonomous navigation system in accordance with claim 1, wherein the sensor system (SEN) is fixed in relation to the workspace.

13. An autonomous navigation system in accordance with claim 1, wherein for determining the intermediate target point (ITP), this intermediate target point (ITP) is placed into an unoccupied area of the workspace and approximately at the end of the range ($R_{SEN}$) of the sensor system (SEN).

14. An autonomous navigation system in accordance with claim 1, comprising means for determining the intermediate target point (ITP), and wherein the intermediate target point (ITP) is placed into the area of the reference route (RR) outside the safety zone (SA) and outside the range ($R_{SEN}$) of the sensor system (SEN).

15. An autonomous navigation system in accordance with claim 1, wherein the safety zone (SA) designed as safety ellipses.

16. An autonomous navigation system in accordance with claim 1, wherein the safety zone (SA) is surrounded by an expanded safety zone which is determined by taking into account traveling speed and dynamics of the robot (ROB), whereby evasion is still possible, even if the robot enters the expanded safety zone, without the actual safety zone being violated.

17. An autonomous navigation system in accordance with claim 1, wherein the gradient of the virtual harmonic potential field (HPF or HPFR) has a finite curvature which the robot can follow taking into consideration dynamics thereof.

18. An autonomous navigation system in accordance with claim 1, wherein the measured data of the sensor system (SEN) is collected in the robot coordinate system ($x_R$, $y_R$) specific to the robot, the navigation level (LNC) calculates the virtual harmonic potential field (HPF or HPFR) in the Cartesian space of the robot coordinate system ($x_R$, $y_R$) and transforms the potential into control commands for the drive and steering systems in the configuration space of the robot coordinate system.

19. An autonomous navigation system in accordance with claim 1, wherein the measured data of the sensor system (SEN) is collected in the robot coordinate system ($x_R$, $y_R$) specific to the robot (ROB) or the manipulator and are transformed in the configuration space of the robot coordinate system, and the navigation level (LNC) calculates the virtual harmonic potential field (HPF or HPFR) in the configuration space of the robot coordinate system and directly defines the control commands for the drive and steering systems.

20. An autonomous navigation system in accordance with claim 1, wherein the measured data of the sensor system (SEN) is collected in the workspace coordinate system ($x_W$, $y_W$) and transformed in the Cartesian space of the robot coordinate system ($x_R$, $y_R$), and the navigation level (LNC) calculates the virtual harmonic potential field (HPF or HPFR) in the Cartesian space of the robot coordinate system ($x_R$, $y_R$) and transforms the potential into control commands for the drive and steering systems in the configuration space of the robot coordinate system.

21. An autonomous navigation system in accordance with claim 1, wherein the measured data of the sensor system (SEN) is collected in the workspace coordinate system ($x_W$, $y_W$) and transformed in the configuration space of the robot coordinate system, and the navigation level (LNC) calculates the virtual harmonic potential field (HPF or HPFR) in the configuration space of the robot coordinate system and in this way directly defines the control commands for the drive and steering systems.

22. An autonomous navigation system for a mobile robot in accordance with claim 1, wherein non-holonomic kinematics and the size of the robot are taken into consideration in the configuration space.

23. An autonomous navigation system for a manipulator in accordance with claim 1, wherein the coordinates of the joints and the size of the links of the manipulator are taken into consideration in the configuration space of the manipulator.

* * * * *